United States Patent
Lebel et al.

(10) Patent No.: US 11,487,896 B2
(45) Date of Patent: Nov. 1, 2022

(54) SENSITIVE DATA SHIELD FOR NETWORKS

(71) Applicant: Bright Lion, Inc., Seattle, WA (US)

(72) Inventors: Lawrence B. Lebel, Arcata, CA (US); Brian D. Tawney, Portland, OR (US)

(73) Assignee: Bright Lion, Inc., Seattle, WA (US)

( * ) Notice: Subject to any disclaimer, the term of this patent is extended or adjusted under 35 U.S.C. 154(b) by 212 days.

(21) Appl. No.: 16/443,500

(22) Filed: Jun. 17, 2019

(65) Prior Publication Data

US 2019/0384933 A1    Dec. 19, 2019

Related U.S. Application Data

(60) Provisional application No. 62/686,629, filed on Jun. 18, 2018.

(51) Int. Cl.
*G06F 21/62* (2013.01)
*G06F 21/60* (2013.01)
(Continued)

(52) U.S. Cl.
CPC ........ *G06F 21/6245* (2013.01); *G06F 21/602* (2013.01); *G06F 21/606* (2013.01);
(Continued)

(58) Field of Classification Search
CPC .. G06F 21/602; G06F 21/606; G06F 21/6245; G06Q 20/40; G06Q 20/3672
(Continued)

(56) References Cited

U.S. PATENT DOCUMENTS

| 7,152,244 B2* | 12/2006 | Toomey | H04L 63/1408 |
| | | | 709/224 |
| 8,458,487 B1* | 6/2013 | Palgon | G06F 21/00 |
| | | | 713/193 |

(Continued)

FOREIGN PATENT DOCUMENTS

| WO | 2013019567 A2 | 2/2013 |
| WO | 2015126755 A1 | 8/2015 |

(Continued)

OTHER PUBLICATIONS

NPL Search Terms (Year: 2021).*
(Continued)

*Primary Examiner* — Syed A Zaidi
(74) *Attorney, Agent, or Firm* — Han Santos, PLLC

(57) ABSTRACT

The present disclosure describes techniques that facilitate a Secure Data Processing (SDP) Network that is configured isolating sensitive data from exposure to a client workstation and a connected web server and application server. Specifically, a secure communications server of the SDP network is described that can interact with a secure input device or a secure plug-in component at the client workstation to receive a set of data associated with the sensitive data. The set of data may correspond to devalued data received via a secure input device or the set of data may be received as sensitive data via a hosted webpage invoked by the secure communications server. The secure communications server may establish a secure communications path with a tokenization server for receipt of a token that represents the sensitive data. The token may then be used by at least the application server to initiate the transaction.

14 Claims, 8 Drawing Sheets

(51) Int. Cl.
*G06Q 20/36* (2012.01)
*G06Q 20/40* (2012.01)

(52) U.S. Cl.
CPC ......... *G06Q 20/3672* (2013.01); *G06Q 20/40* (2013.01); *G06Q 2220/00* (2013.01)

(58) Field of Classification Search
USPC .......................................................... 726/26
See application file for complete search history.

(56) References Cited

U.S. PATENT DOCUMENTS

| | | | | |
|---|---|---|---|---|
| 8,464,352 | B2* | 6/2013 | Toomey | G06F 21/57 726/30 |
| 9,514,452 | B2 | 12/2016 | Dhar et al. | |
| 9,609,025 | B1 | 3/2017 | Betzler et al. | |
| 10,928,906 | B2* | 2/2021 | Balint | G06F 3/0488 |
| 11,080,700 | B2 | 8/2021 | Ortiz et al. | |
| 2004/0117302 | A1 | 6/2004 | Weichert et al. | |
| 2008/0244277 | A1 | 10/2008 | Orsini et al. | |
| 2012/0259782 | A1 | 10/2012 | Hammad | |
| 2012/0323784 | A1* | 12/2012 | Weinstein | G06Q 40/02 705/44 |
| 2014/0122198 | A1* | 5/2014 | Cheung | G06Q 30/0207 705/14.13 |
| 2014/0188734 | A1* | 7/2014 | Neuwirth | H04L 29/12518 705/65 |
| 2014/0337238 | A1* | 11/2014 | Leighton | H04W 12/065 705/71 |
| 2016/0125397 | A1 | 5/2016 | Strydom et al. | |
| 2016/0277374 | A1 | 9/2016 | Reid et al. | |
| 2017/0270515 | A1 | 9/2017 | McCullagh et al. | |
| 2017/0308882 | A1* | 10/2017 | Bedier | G06Q 20/085 |
| 2017/0357957 | A1 | 12/2017 | Mehta et al. | |
| 2018/0082289 | A1 | 3/2018 | Johnson et al. | |
| 2019/0354718 | A1* | 11/2019 | Chandnani | G06Q 30/0201 |
| 2019/0384933 | A1 | 12/2019 | Lebel et al. | |
| 2020/0143375 | A1 | 5/2020 | Gurunathan et al. | |
| 2021/0029100 | A1 | 1/2021 | Bendersky et al. | |

FOREIGN PATENT DOCUMENTS

| | | |
|---|---|---|
| WO | 2018118067 A1 | 6/2018 |
| WO | 2019231457 A1 | 12/2019 |
| WO | 2020104809 A1 | 5/2020 |

OTHER PUBLICATIONS

NPL Search Terms (Year: 2022).*
International Application No. PCT/US2019/037820, International Search Report and Written Opinion dated Sep. 10, 2019, 12 pages.
Anonymous: "Technologies for Payment Fraud Prevention: EMV, Encryption, and Tokenization", Smart Card Alliance, Oct. 2014 (Oct. 2014), XP055743920, Retrieved from the Internet: URL:www.smartcardalliance.org [retrieved on Oct. 26, 2020] * the whole document*.
European Patent Application No. 19822457.8, Search Report dated Jan. 14, 2022, 10 pages.
Definitions for secure communication, Definitions, dated Mar. 2, 2021, https://web.archive.org/web/20210302031700/https:// www.definitions.net/definition/secure+communication (Year: 2021).
European Patent Application No. 21171711.1, Search Report dated Sep. 29, 2021, 8 pages.
Secure Communication for Internet Payment in Heterogeneous Networks by Refka Abdellaoui, dated 2010 https://ieeexplore.ieee.org/stamp/stamp.jsp?p=&arnumber=547 4833 (Year: 2010).
U.S. Appl. No. 17/245,957, Office Action dated Jan. 25, 2022, 72 pages.

* cited by examiner

SENSITIVE DATA SHIELD FOR NETWORKS

RELATED APPLICATION

This application claims priority to a commonly owned U.S. Provisional Patent Application No. 62/686,629 filed on Jun. 18, 2018, and titled "Bifurcated Channel Secure Communications," which is herein incorporated by reference in its entirety.

BACKGROUND

Cybersecurity threats compromise our computing and communications infrastructure and the trust that governments, enterprises and the public have in applications running on that infrastructure. Cybersecurity threats include any design flaws that may be exploited by malicious actors resulting in the theft of or damage to computing and communications assets including sensitive personal information. If people do not trust communications infrastructure, and risk loss of identity, property, data, and functionality, they will limit the use or stop any substantive use altogether. With the current volume of known cybersecurity breaches, responsible parties engaged in information technology (IT) are facing ever-increasing costs to manage risk.

Regulatory and compliance regimes are a means to reduce cybersecurity threats and related threats to data privacy, e.g. identity theft, credit card fraud, etc. Entities that receive sensitive personal data through their business processes, e.g. payment card data, social security numbers, are required to, or otherwise agree to, perform by the standards published by such entities, e.g. the Payment Card Industry Data Security Standard ("PCI DSS"). Complying with, and demonstrating compliance with, such standards is a significant and increasing cost of doing business.

Remote purchases are one example of a communications channel facing cybersecurity threats. A remote purchase may be performed by online payment via a web store remote application, or by a phone transaction with a customer service agent. These transactions may make use of point of sale software and/or payment kiosks, e-commerce web stores for online orders or inside sales teams for phone orders. Remote purchases may include the provisioning of sensitive data and may be subject to a cybersecurity standard, such as the Payment Card Industry Data Security Standard (PCI DSS). Although all such "merchants" have signed an agreement with their bank that they will comply with PCI DSS, it can be costly for such enterprises and parties that accept payment cards to comply with PCI DSS. Compliance with a cybersecurity standard, such as PCI DSS, may necessitate that enterprises and parties implement controls, protocols, software and facilitate testing of a platform that is intended to receive remote purchases. In some examples, compliance may also compel an additional cost of a third-party audit, for example by a Regulatory Compliance Assessor (RCA)RCA just as failure to comply can lead to significant fines and even constraints on future acceptance of payment cards.

Merchant enterprises that deal with remote purchases can be obligated to comply with cybersecurity standards, such as the Payment Card Industry Data Security Standard (PCI DSS), by their financial institutions as a precondition to using their financial institution's services. Consequently, merchant enterprises face the dilemma of bearing the costs of complying with a cybersecurity standard, such as PCI DSS, or bearing the cost of contracting a service provider to implement the necessary controls, protocols, and software that shows compliance.

In general, there is a class of communications problems associated with transmissions of sensitive data from a remote user to a server-side application, or from a remote user to an agent connected to a server-side application. Each transmission may be conducted in a manner that necessitates a predetermined level of compliance with cybersecurity standards. Similarly, there are a class of problems associated with the exposure of sensitive data, such as a payment card number on devices such as servers and workstations. Related issues may also impact other devices that are connected to those exposed devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1A illustrates a first computing environment that is configured to process sensitive data as devalued data from a secure input device. FIG. 1B illustrates a second computing environment that is configured to process sensitive data via a secure plug-in native to a client workstation.

FIG. 2A illustrates an example process that uses a secure input device to convert sensitive data into devalued data for transmission to an SDP network. FIG. 2B illustrates an example process that uses a secure plug-in native to a client workstation to transmit sensitive data for transmission to an SDP network

DETAILED DESCRIPTION

Figure 1A:
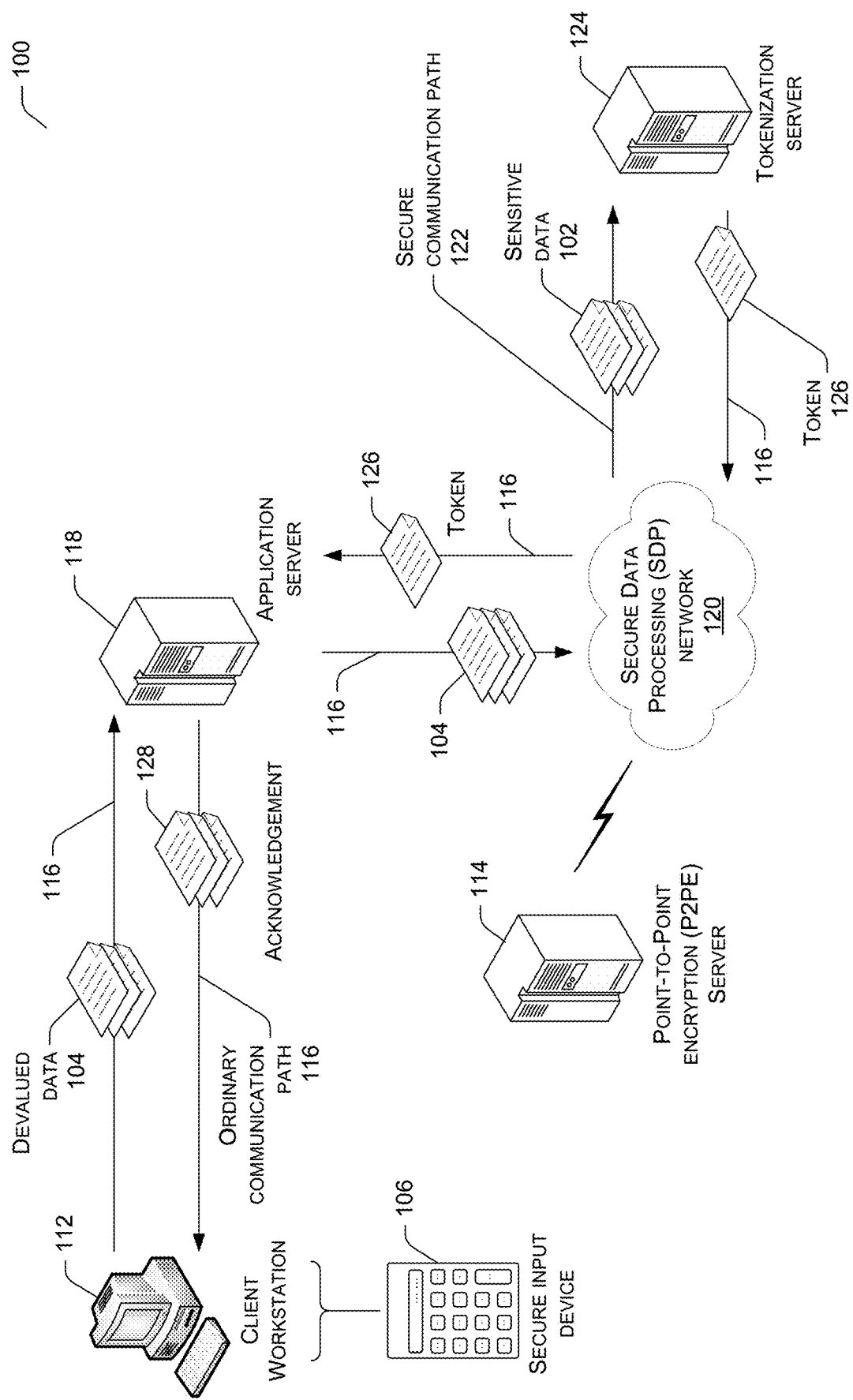
FIGS. 1A and 1B illustrate exemplary computing environments that facilitate isolating sensitive data to a Secure Data Processing (SDP) network.

This disclosure describes techniques for automating the transfer of risk associated with compliance of a cybersecurity standard, such as the Payment Card Industry Data Security Standard (PCI DSS), from one party to another. More specifically, this disclosure describes techniques to architect a separation of software components, services, communications channels and data such that the handling of sensitive data in a standards-compliant manner may be isolated to a designated network, namely a Secure Data Processing (SDP) network. In various examples, an SDP network and related infrastructure may be configured to isolate the use and transfer of sensitive data that, for purposes of business operations or the business system application, would otherwise be exposed to a portion of a client workstation and/or an application server, e.g. a company's business system. Sensitive data may include personally identifiable information, such as a Primary Account Number (PAN) (i.e. a credit card number, social security number, or bank account number) and/or user authentication credentials. In this way, a client workstation and corresponding application servers, which would ordinarily be exposed to sensitive data inherent in certain transactions, remain free from exposure to sensitive data. In this way, these transactions are freed from the risk of cybersecurity threats and are therefore outside the scope of PCI DSS compliance.

Traditionally, system components of a computing environment that are exposed to sensitive data may be subjected to a Regulatory Compliance Assessor (RCA) audit. By way of example, an RCA audit may be pursuant to a PCI DSS cybersecurity standard. The PCI DSS cybersecurity standard has adopted scoping categories that determine whether a system component is subject to an RCA audit. The scoping categories include:

Category 1—System components that process, store or transmit sensitive data such as cardholder data (CHD) or are not isolated or restricted through controlled access from other Category 1 system components.

Category 2—System components that have controlled access to a Category 1 system component and do not themselves ever process, store or transmit sensitive data.

Category 3—System components that are isolated from all Category 1 system components.

In this regard, system components that fall within Category 1 and Category 2 are subject to an RCA audit pursuant to the PCI DSS cybersecurity standard.

In a non-limiting example, consider a client workstation that is facilitating a consumer e-commerce transaction. In this example, the consumer may navigate to an e-commerce website to purchase a particular item. To facilitate the transaction, the consumer may enter a PAN into an input field within the e-commerce website, as consideration for the transaction. The client workstation may transmit transaction details to an application server, via a web server, to execute the transaction. In this example, the PAN is considered sensitive data, pursuant to the PCI DSS cybersecurity standard. Further, the client workstation, web server, and application server that receive, store, and/or transmit the PAN may be considered as Category 1 devices, pursuant to the PCI DSS cybersecurity standard, and therefore subject to an RCA audit.

An RCA audit may act to transfer some of the liability associated with managing a system's cybersecurity threats from a system owner to an RCA auditor. While the transfer of some liability of cybersecurity threats may benefit the system owner, the cost penalty of transferring liability may be burdensome on some system owners. Therefore, this disclosure describes an SDP network and related infrastructure that is configured to isolate a client workstation from exposure to sensitive data, thus keeping the client workstation and interfacing web servers and application servers outside of scope for PCI DSS compliance and not subject to an RCA audit.

Referring to the previous example, the techniques described herein may facilitate isolating the PAN (i.e. sensitive data) that is entered as part of an e-commerce transaction from being received, stored, and/or transmitted by a client workstation. In one example, the PAN may be entered directly into a hosted webpage invoked, via a secure plug-in, by a secure communications server of the SDP network. The hosted webpage may isolate entry of the PAN from the client workstation, thus resulting in the client workstation being classified as a Category 3 device pursuant to the PCI DSS cybersecurity standard, and therefore not subject to RCA audit. The secure plug-in is installed on the client workstation such that it remains segregated from transactional data flow with a web server or application. Thus, despite being connected to the client workstation, the webserver and application servers are not exposed to the PAN, and thus remain Category 3 devices. In another example, the PAN may be entered via a secure input device that is communicatively connected to the client workstation. The secure input device may correspond to a secure card reader, a point of sale device, or an integrated key pad. The secure input device may transform the PAN to devalued data prior to transmission to the client workstation. Even though the devalued data is transformed from sensitive data, the devalued data retains no extrinsic value or meaning, and thus receiving, storing and/or transmitting the devalued data does not invoke a Category 1 classification, pursuant to the PCI DSS cybersecurity standard. Instead, upon receipt of the PAN as devalued data, the client workstation is considered a Category 3 device and therefore not subject to an RCA audit. Similarly, the web server and application server that interact with the client workstation to receive, store, and/or transmit the devalued data are also considered to be Category 3 devices pursuant to the PCI DSS cybersecurity standard, and therefore not subject to an RCA audit.

In summary, the PAN (i.e. sensitive data) may be transmitted from the client workstation directly to a secure communications server within the SDP network as sensitive data, via a secure plug-in and hosted webpage or as devalued data in response to entry via a secure input device. At the secure communications server, the devalued data may be decrypted and/or transformed via a Point-to-Point Encryption (P2PE) server to recreate the PAN (i.e. sensitive data). The PAN (i.e. sensitive data) may be transmitted via the secure communications server to a tokenization server, which generates and returns a token to the secure communications server based on the sensitive data. The token may represent the sensitive data and may be used instead of the sensitive data (i.e. the PAN) to initiate a transaction. The token itself does not include sensitive data. The token has no extrinsic or exploitable value or meaning and is instead configured to map back to the sensitive data at the tokenization server, e.g. during an authorization of a payment card in a sales order entry process.

In this example, since secure communications server and the tokenization server each receive, store, and transmit sensitive data, each server is considered to be a Category 1 device, pursuant to the PCI DSS cybersecurity standard, and therefore subject to an RCA audit.

Therefore, the techniques described herein facilitate isolating a Category 1 system components for handling sensitive data to a secure communications server of an SDP network and a tokenization server. The client workstation, an interacting web server, and application server remain Category 3 devices, since they are isolated from sensitive data, and thus not subject to an RCA audit.

In addition, this disclosure further describes techniques that protect a client workstation from being considered a Category 1 device in the event that a user inadvertently enters sensitive data (i.e. PAN) into the client workstation instead of via a secure input device or via a hosted webpage invoked by a secure plug-in. Consider an example of a consumer or sales agent entering sensitive data directly into an input field of a client workstation. Since the client workstation has received sensitive data (i.e. PAN), albeit inadvertently, the client workstation may be considered a Category 1 device, and thus subject to an RCA audit. Additionally, in the event that the web server and application server have controlled access to the client workstation (i.e. communicative connection), the web server and application server may be considered at least Category 2 devices, and thus subject to an RCA audit pursuant to the PCI DSS cybersecurity standard.

To protect the client workstation from inadvertently being considered a Category 1 device, this disclosure describes a secure data shield component that interacts with the client workstation to prevent the inadvertent entry of sensitive data into an input field on the client workstation. The secure data shield component may be configured to prevent data entry on the client workstation that is substantially similar to sensitive data. Consider, as a non-limiting example, a secure data shield component that prevents an inadvertent entry of a 16-character PAN. In this example, the secure data shield may prevent the entry of data strings that are substantially similar to a 16-character PAN. A substantially similar data string may comprise of a data string length that is less than the 16-character PAN by a predetermined number of characters. The predetermined number of characters may comprise two characters, three characters, four characters, or any number of characters that is greater than or equal to one character. In various examples, the characters may include numbers, letters, symbols, or any combination thereof. In this way, the secure data shield component may halt the inadvertent entry of a complete PAN (i.e. sensitive data) at a point of partial entry. While this example describes a 16-character PAN, one of ordinary skill in the art may adapt the secure data shield component to prevent an inadvertent entry of a PAN comprising of any number of characters or patterned string of characters.

By shielding the client workstation from the complete entry of the sensitive data, the client workstation, the interacting web server, and the interacting application server, may remain Category 3 devices and therefore not subject to an RCA audit pursuant to the PCI DSS cybersecurity standard.

The term "techniques," as used herein, may refer to system(s), method(s), computer-readable instruction(s), module(s), algorithms, hardware logic, and/or operation(s) as permitted by the context described above and through the document.

Figure 1B:
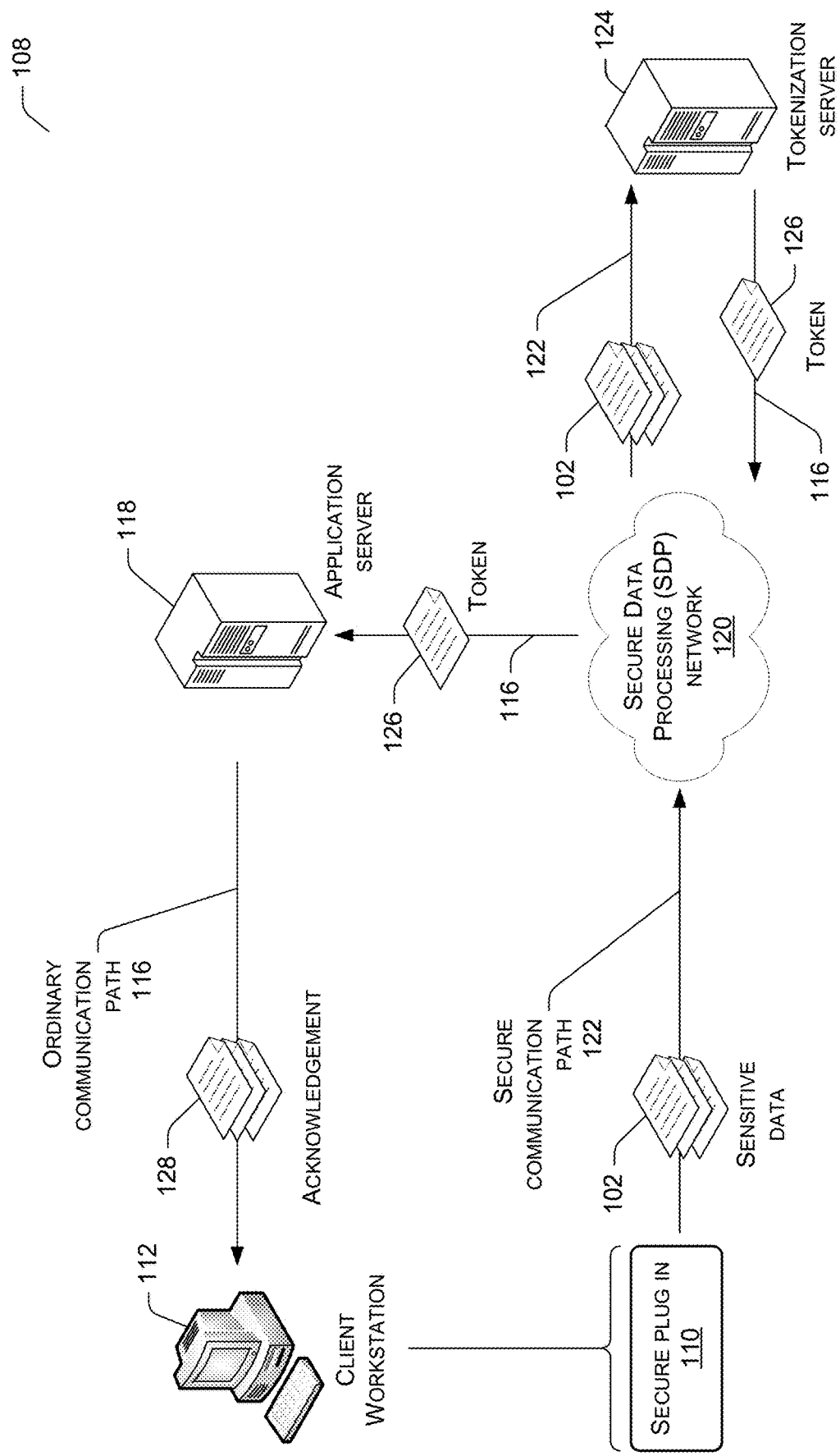

FIGS. 1A and 1B illustrate exemplary computing environments that facilitate isolating sensitive data to a Secure Data Processing (SDP) network. FIG. 1A illustrates a first computing environment 100 that is configured to process sensitive data 102 as devalued data 104 from a secure input device 106. FIG. 1B illustrates a second computing environment 108 that is configured to process sensitive data 102 via a secure plug-in 110 that is native to a client workstation 112.

In various examples, a user may initiate a transaction that includes sensitive data 102 via a client workstation 112. The sensitive data 102 may include payment cardholder data (CHD), such as a credit card number and authentication credentials sufficient to draw funds from an associated financial account. By way of example, unauthorized access of sensitive data 102 may allow another party to commandeer funds from the associated financial account without first gaining the user's authorization. Sensitive data 102 may also include personally identifiable data and any other information that is subject to privacy law and/or regulation(s).

Referring to FIG. 1A, the first computing environment 100 describes the input of sensitive data 102 via a secure input device 106. The secure input device 106 corresponds to a registered PCI DSS device, which is configured to receive sensitive data 102 as a user input and transform the sensitive data into devalued data prior to transmission to a client workstation 112.

In one example, the secure input device 106 may be configured to devalue sensitive data 102 upon receipt and make use of a Point-to-Point Encryption (P2PE) server 114 to do so. Accordingly, the secure input device 106 itself is not considered a Category 1 device (i.e. processes, stores, or transmits sensitive data 102), because it performs real-time encryption to protect sensitive data 102.

The secure input device 106 may correspond to a secure card reader, a point of sale device, or an integrated card reader. Alternatively, or additionally, the secure input device 106 may comprise of a keypad, with an optional display, where sensitive data 102, such as a PAN, may be entered. Note, however, that even though the client workstation 112 is communicatively connected to the secure input device 106, since the secure input device 106 is a registered PCI DSS device, the client workstation 112 is considered a Category 3 device. Thus, the client workstation 112 remains out of scope for an RCA audit. It is noteworthy, that the client workstation 112 is further protected from inadvertent entry of sensitive data via secure data shield component, which is discussed in further detail with reference to FIG. 2.

In the illustrated example, the client workstation 112 may receive sensitive data 102 from the secure input device 106 as devalued data 104. In one example, the sensitive data 102 may correspond to a Primary Account Number (PAN) (i.e. a credit card number or bank account number) to provision consideration for a transaction. Thus, the devalued data 104 corresponds to a representation of the PAN that retains no extrinsic value or meaning. In some examples, devalued data may be generated by a two-way (i.e. reversible) mathematical function that converts the sensitive data to an unintelligible value. Therefore, the client workstation 112 may transmit the devalued data 104 via an ordinary communications path 116, without risk of inadvertently compromising any sensitive data 102.

The ordinary communications path 116 may be a typical communications connection established via any type of wired and/or wireless network, including but not limited to local area networks (LANs), virtual private networks (VPNs), wide area networks (WANs), satellite networks, cable networks, Wi-Fi networks, Wi-Max networks, mobile communications networks (e.g. 3G, 4G, and so forth), or any combination thereof.

It is noteworthy that even though most communications connections have some degree of encryption and security, the ordinary communications path 116, as described herein, is not security-rated nor is it otherwise considered to possess sufficient security to transmit sensitive data. Thus, the ordinary communications path 116 is configured to transmit non-sensitive data, such as devalued data 104.

The client workstation 112 may transmit the devalued data 104 to an application server 118 via the ordinary communications path 116. Upon receipt of the devalued data 104, the application server 118 may transmit the devalued data to the Secure Data Processing (SDP) network 120 via an ordinary communications path. In various examples, the SDP network 120 may include functions that handle sensitive data 102 in a manner that is compliant with prevailing cybersecurity standards, such as the PCI DSS cybersecurity standard. Functions may include, but are not limited, to encryption, tokenization, secure communications, interfacing with third parties, or any combination thereof. The SDP network 120 is described in further detail with reference to FIGS. 2A, 2B, and 4.

The SDP network 120 may interact with the P2PE server 114 that is configured to decrypt/transform the devalued data 104 to the sensitive data 102 that was originally input at the secure input device 106. It is noteworthy that the P2PE server 114 may communicate with an secure communications server of the SDP network 120 via a secure communications path 122 that is configured to provide sufficient security for transmitting the sensitive data to the SDP network 120. In contrast to an ordinary communications path 116, the secure communications path 122 is security-rated or otherwise considered to possess sufficient security to transmit sensitive data. In this way, transmitting sensitive data 102 over the secure communications path 122 mitigates any risk of a cybersecurity threat exposing the sensitive data 102.

Upon receipt of the sensitive data 102 from the P2PE server 114, the SDP network 120 may transmit the sensitive data 102 to a tokenization server 124 via a secure communications path 122 to receive a token 126. The tokenization server 124 may be configured to generate the token 126 based at least in part on the sensitive data 102. Tokenization, when applied to data security, is a process of substituting sensitive data with a non-sensitive equivalent (i.e. the token 126). The token may represent the sensitive data and may be used instead of the sensitive data (i.e. the PAN) to initiate a transaction at the client workstation, such as a payment authorization. In this example, the token 126 has no extrinsic or exploitable value or meaning. Instead, the token 126 is configured to map back to the sensitive data 102 through the tokenization server 124. Therefore, the tokenization server 124 may transmit the token 126 to the SDP network 120 via an ordinary communications path 116 without risk of inadvertently compromising any sensitive data 102.

Moreover, the SDP network 120 may transmit the token 126 to the application server 118 via an ordinary communications path 116. In some examples, the application server 118 may transmit an acknowledgment 128 of receipt of the token 126 to the client workstation 112 via an ordinary communications path 116.

In summary, the first computing environment 100 describes the use and transformation of sensitive data 102 at the SDP network 120 (or, components thereof as discussed in more detail with reference to FIGS. 2A, 2B, and 4), the P2PE server 114, and a tokenization server 124. Each of these above-referenced systems interact directly with sensitive data 102 and therefore are considered Category 1 devices, pursuant to the PCI DSS cybersecurity standard. Note that the secure input device 106 is not considered a Category 1 device since it performs real-time encryption of sensitive data. Notwithstanding, the client workstation 112 and application server 118—along with any intermediary web servers—remain free from exposure to the sensitive data 102 and receive only instances of devalued data 104 or a token 126, each of which is representative of sensitive data 102, but do not include sensitive data 102. Thus, the client workstation 112, application server 118, and an intermediary web server, are considered Category 3 devices pursuant to the PCI DSS cybersecurity standard and therefore out of scope of an RCA audit.

Referring to FIG. 1B, the second computing environment 108 describes the input of sensitive data 102 via secure plug-in 110. The secure plug-in 110 may reside on the client workstation 112 and may interact with web pages, web browsers-based application, and client applications native to the client workstation 112. The secure plug-in 110 is specifically served via the SDP network 120 and is configured to invoke a hosted webpage associated with a secure communications server of the SDP network 120. The secure communications server of the SDP network 120 is discussed in more detail with reference to FIGS. 2A, 2B, and 4. The inclusion of the secure plug-in 110 acts to isolate the sensitive data 102 from other client applications that reside and/or operate via the client workstation 112 and to segregate a connected web server and application server from exposure to the sensitive data 102. In this way, the sensitive data 102 captured by the hosted webpage invoked by the secure plug-in 110 is protected from being exposed via another client application on the client workstation 112.

In this example, a secure communications server of the SDP network 120 (i.e. the secure communications server of the SDP network 120 is discussed in further detail with reference to FIGS. 2A, 2B, and 4) may receive the sensitive data 102 from the secure plug-in 110 via a secure communications path 122. Upon receipt of the sensitive data 102, the secure communications server of the SDP network 120 may transmit the sensitive data 102 to a tokenization server 124 via secure communications path 122 to receive a token 126. Further, the token 126 to an application server 118 associated with the client workstation 112 via an ordinary communications path 116. In some examples, the application server 118 may transmit an acknowledgment 128 of receipt of the token 126 to the client workstation 112 via an ordinary communications path 116.

In summary, the second computing environment 108 describes the use and transformation of sensitive data 102 at a secure communications server of the SDP network 120 and the tokenization server 124. Since the secure plug-in 110 is configured to invoke a hosted webpage associated with the secure communications server of the SDP network 120, the use and transformation of sensitive data 102 received at the secure plug-in 110 is considered as being received at the SDP network 120. The secure communications server of the SDP network 120 and the tokenization server 124 interact directly with the sensitive data 102, and therefore are considered Category 1 devices, pursuant to the PCI DSS cybersecurity standard. Notwithstanding, the client workstation 112, the application server 118, and any intermediary web servers, remain free from exposure to the sensitive data 102 and receive only a token 126, which is representative of sensitive data 102, but do not include the sensitive data 102. Thus, the client workstation 112, application server 118, and an intermediary web server, are considered Category 3 devices, pursuant to the PCI DSS cybersecurity standard and therefore out of scope of an RCA audit.

In various examples, the application server 118 may operate on one or more distributed computing resource(s). The one or more distributed computing resource(s) may include one or more computing device(s) that operate in a cluster or other configuration to share resources, balance load, increase performance, provide fail-over support or redundancy, or for other purposes.

Moreover, the client workstation 112 may correspond to any sort of electronic device, such as a cellular phone, a smartphone, a tablet computer, an electronic reader, a media player, a gaming device, a personal computer (PC, a laptop computer), etc. In various examples, the client workstation 112 may be a remote device relative to the application server 118, intermediary web servers, and the SDP network 120.

Figure 2A:
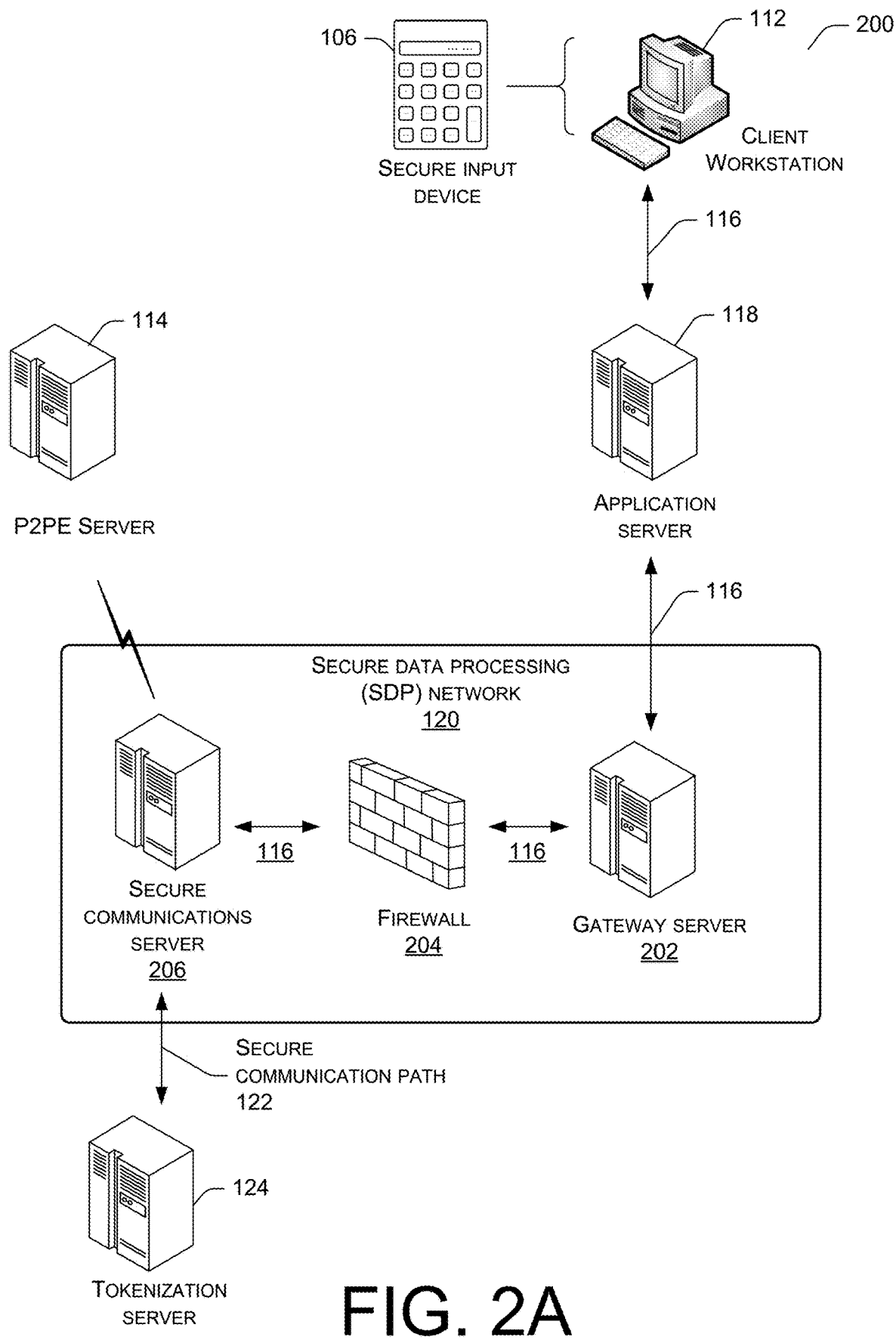
FIGS. 2A and 2B illustrate blocks of process interactions between a client workstation and the SDP network.
Figure 2B:
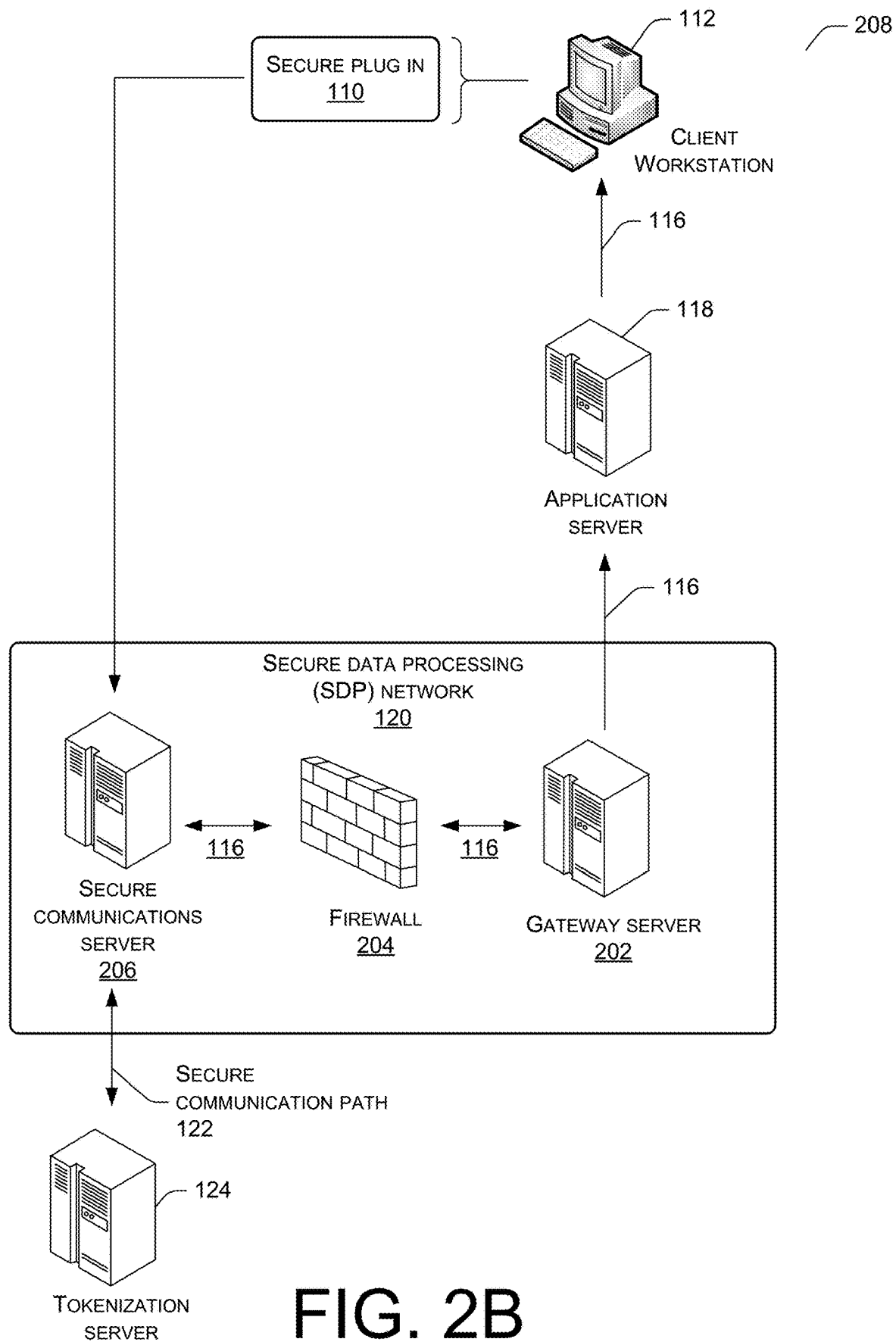

FIGS. 2A and 2B illustrate blocks of process interactions between a client workstation and the SDP network. FIG. 2A illustrates an example process that uses a secure input device to receive sensitive data as devalued data. FIG. 2B illustrates an example process that uses a secure plug-in native to a client workstation to receive sensitive data.

Referring to FIG. 2A, the first computing environment 200 includes various components that are the same or substantially similar to the first computing environment 100 described with reference to FIG. 1A, except for the SDP network 120. As such, for brevity and ease of description, various details relating to the first computing environment 200 are omitted herein to the extent that the same or similar details have been provided above with reference to FIG. 1A.

In this example, the client workstation 112 may receive an instance of devalued data 104 from a secure input device 106. The devalued data 104 may correspond to a transaction being performed on the client workstation 112 and may be representative of, but not inclusive of, financial account data (i.e. PAN) to authorize payment for the transaction. In this way, the client workstation 112 may transmit the devalued data 104 to an application server 118 associated with the transaction via an ordinary communications path 116. The application server 118 may transmit the devalued data 104 to the SDP network 120 via an ordinary communications path 116 for the purpose of receiving a token 126. The token 126 may represent the sensitive data 102 may be used for a transaction conducted at the client workstation, such as a payment authorization.

In the illustrated example, the SDP network 120 may comprise a gateway server 202, a firewall 204, and a secure communications server 206. The gateway server 202 may be communicatively connected to the firewall 204 via an ordinary communications path 116 and the firewall 204 may be communicatively connected to the secure communications server 206 via an ordinary communications path 116.

Referring to FIG. 2A, the secure communications server 206 may receive devalued data 104 from the gateway server 202. As discussed earlier, the devalued data 104 is representative of, but not inclusive of, sensitive data 102 entered via a secure input device 106 at a client workstation 112.

In this example, the secure communications server 206 may interact with the P2PE server 114 to decrypt/transform the devalued data 104 into sensitive data 102. In some examples, the secure communications server 206 and the P2PE server 114 may interact via a secure communications path 122. In other examples, the secure communications path 122 and the P2PE server 114 may interact via a secure communications path that is proprietary to the P2PE server 114.

The secure communications server 206 may transmit the sensitive data 102 to a tokenization server 124. The tokenization server 124 may generate a token 126 that represents the sensitive data 102. The token 126 may then be used in place of the sensitive data 102. In one non-limiting example, consider a transaction initiated at a client workstation 112. Upon receipt of the sensitive data 102 (i.e. cardholder payment data), the tokenization server 124 may generate a token 126 that represents the sensitive data 102 (i.e. cardholder payment data). The token 126 may then be used instead of the cardholder payment data (i.e. sensitive data 102) to authorize payment for the transaction initiated at the client workstation 112. The token 126 itself does not include the cardholder payment data (i.e. sensitive data 102). Instead, the token 126 comprises devalued data 104 that can be used by the tokenization server 124 to map to the sensitive data 102 stored within the third-party processing service. In this way, the token 126 represents but does not include the sensitive data 102 that is stored securely within the third-party processing service. Therefore, being fully devalued and having no extrinsic value, the tokenization server 124 may transmit the token 126 to the secure communications server 206 via an ordinary communications path 116.

In this example, the secure communications server 206 and the tokenization server 124 each process, store, and/or transmit sensitive data 102. Therefore, the secure communications server 206 and the tokenization server 124 are considered Category 1 devices pursuant to the PCI DSS cybersecurity standard and are within scope of an RCA audit.

The gateway server 202 is configured to isolate system components configured to serve sensitive data 102 from other system components that are to be isolated from sensitive data 102. Referring to the PCI DSS cybersecurity standard, the gateway server 202 may isolate system components that process, store, or transmit sensitive data 102 (i.e. Category 1 devices) from system components that are to be isolated from sensitive data 102 (i.e. Category 3 devices). In the illustrated example, the gateway server 202 may receive and transmit non-sensitive data between the application server 118 and the secure communications server 206, via the firewall 204. In one example, the gateway server 202 may receive devalued data 104 from the application server 118 for transmission to the secure communications server 206. In another example, the gateway server 202 may receive a token 126 from the secure communications server 206 for transmission to the application server 118. Since the gateway server 202 does not process, store, or transmit sensitive data 102, it is not considered a Category 1 device, pursuant to the PCI DSS cybersecurity standard. However, the gateway server 202 does have controlled access to a Category 1 system component, namely the secure communications server 206, and therefore, the gateway server 202 is considered a Category 2 device pursuant to the PCI DSS cybersecurity standard, and within scope of an RCA audit.

The firewall 204 between the gateway server 202 and the secure communications server 206 is configured to prevent sensitive data 102 from being transmitted outward from the secure communications server 206 to the gateway server 202. In this example, the firewall 204 provides an added level of security to ensure that the gateway server 202 does not inadvertently become a Category 1 device in response to inadvertent exposure to sensitive data 102. In various examples, the firewall 204 may be configured to prevent an inadvertent transmission of data that resembles sensitive data 102. For example, the firewall 204 may be configured to prevent transmission of a data string that resembles a PAN (i.e. sensitive data 102). In this example, the firewall 204 may prevent transmission of any data string length that is substantially similar to the PAN. A substantially similar data string may comprise of a data string length that is less than the data length of the PAN by a predetermined number of characters. The predetermined number characters may comprise of two characters, three characters, four characters, or any number of characters greater than or equal to one character. In this way, the firewall 204 halt the inadvertent transmission of sensitive data 102 between the secure communications server 206 and the gateway server 202.

By shielding the gateway server 202 from sensitive data 102, the gateway server 202 may remain a Category 2 device, and the application server 118, which is communicatively connected to the gateway server 202, may remain a Category 1 device.

Referring to FIG. 2B, the second computing environment 208 includes various components that are the same or substantially similar to the first computing environment 200 described with reference to FIG. 2A and the second computing environment 108 described with reference to FIG. 1B. As such, for brevity and ease of description, various details relating to the second computing environment 208 are omitted herein to the extent that the same or similar details have been provided above with reference to FIG. 1B and FIG. 2A.

In this example, the client workstation 112 may receive an input of an instance of sensitive data 102 at a hosted webpage that is invoked by a secure plug-in 110 at the client workstation 112. The secure plug-in 110 may be considered to interact with client applications that reside and/or operate on the client workstation 112, and in response to a request (i.e. from a client application) for entry of sensitive data, such as a PAN, on the client workstation 112, invoke a hosted webpage from the secure communications server 206 of the SDP network 120. Sensitive data received via the hosted webpage is directly transmitted to the secure communications server 206. Thus, the inclusion of the secure plug-in 110 acts to isolate sensitive data from the client applications that reside and/or operate via the client workstation 112. By isolating the sensitive data 102 from other client applications on the client workstation 112, the secure plug-in 110 ensures that the client workstation 112 remains a Category 3 device pursuant to the PCI DSS cybersecurity standard, and thus outside the scope of an RCA audit. Similarly, other devices connected to the client workstation 112, such as the application server 118 and any intermediary web servers, remain free from exposure to the sensitive data 102.

Upon receipt of the sensitive data 102 at the secure communications server 206, the secure communications server 206 may transmit the sensitive data 102 to the tokenization server 124 via a secure communications path 122, and in return, receive a token 126 associated with the sensitive data 102 via an ordinary communications path 116. In some examples, the token may comprise of a devalued representation of the sensitive data 102, which is then made available to further authorize a transaction initiated at the client workstation 112, such as a payment authorization.

The secure communications server 206 may transmit the token 126, via the firewall 204, to the gateway server 202 for delivery to the application server 118. In this example, the secure communications server 206 and the tokenization server 124 each process, store, and/or transmit sensitive data 102. Therefore, the secure communications server 206 and the tokenization server 124 are considered Category 1 devices pursuant to the PCI DSS cybersecurity standard and are within scope of an RCA audit. Similarly, the gateway server 202 is considered a Category 2 device pursuant to the PCI DSS cybersecurity standard because it has controlled access to a Category 1 device, namely the secure communications server 206. In this example, the gateway server 202 is also within scope of an RCA audit. However, the application server 118 and the client workstation 112 are isolated from the sensitive data 102 and do not have controlled access to a Category 1 device (i.e. the secure communications server 206 or the tokenization server 124), and are therefore are considered Category 3 devices that are outside the scope of an RCA audit.

Since the SDP network 120, namely the secure communications server 206, firewall 204, and gateway server 202 are collectively isolated, the SDP network architecture lends itself to being owned and operated by a single, separate cybersecurity business entity which may take on the responsibilities and liabilities, i.e. the risk, of handling sensitive data 102 from enterprises and other application users associated with the client workstation 112 and application server 118.

In various examples, the secure communications server 206 and the gateway server 202 may operate on one or more distributed computing resource(s). The one or more distributed computing resource(s) may include one or more computing device(s) that operate in a cluster or other configuration to share resources, balance load, increase performance, provide fail-over support or redundancy, or for other purposes.

Moreover, the SDP network 120, namely the secure communications server 206, the firewall 204, and the gateway server 202, may be hosted on a cloud infrastructure that is hosted behind cybersecurity measures that prevent theft of data, or damage to data or functionality. In this example, the security of the cloud infrastructure may be verified by audit to ensure that the security level meet prevailing cybersecurity standards. By way of example, the cloud infrastructure may include the use of firewalls or whitelist/blacklist algorithms to prevent unauthorized access. In one example, the cloud infrastructure may itself be compliant with relevant PCI DSS requirements.

The cloud infrastructure may comprise a physical dedicated server or a virtual machine. In the latter case, the cloud infrastructure may be represented as a plurality of disaggregated servers that provide virtual application server functionality and virtual storage/database functionality. The disaggregated servers are physical computer servers, which may have a processor, a memory, an I/O interface and/or a network interface. The features and variations of the processor, the memory, the I/O interface and the network interface are substantially similar to those described with reference to FIG. 4.

The cloud infrastructure may provide access to virtual application servers and virtual storage servers. In some examples, the cloud infrastructure may provide additional service abstractions such as Platform as a Service ("PAAS"), Infrastructure as a Service ("IAAS"), a Software as a Service ("SAAS"), or any combination thereof.

Figure 3:
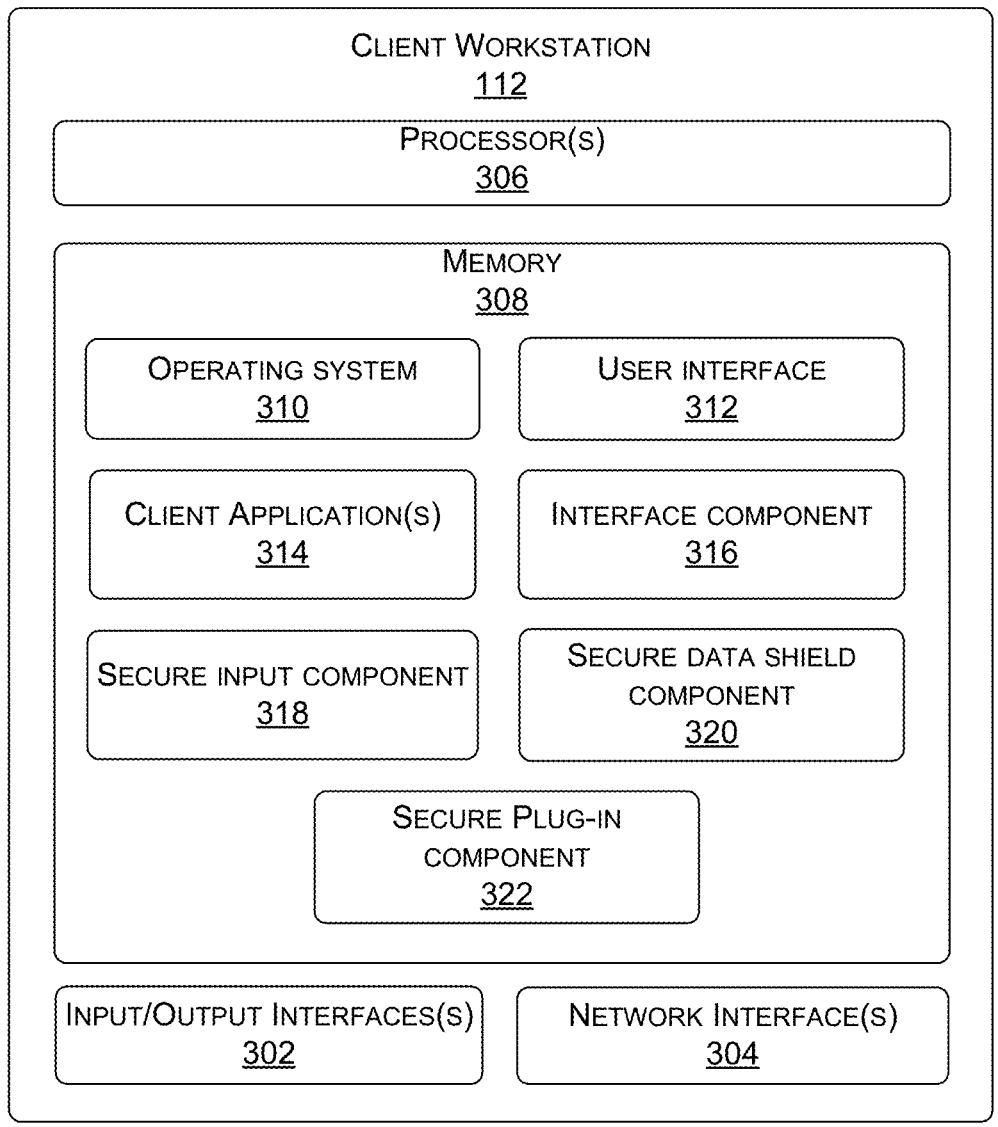
FIG. 3 illustrates a block diagram of various components of a client workstation that interacts with the SDP network.

FIG. 3 illustrates a block diagram of various components of a client workstation 112 that interacts with the SDP network. In this example, the client workstation 112 may receive an input of sensitive data 102 (i.e. via a secure input device or a secure plug-in) that is associated with a transaction. The sensitive data may correspond to a Primary Account Number (PAN) (i.e. a credit card number or bank account number) that is required to authorize payment for the transaction.

The client workstation 112 may include input/output interface(s) 302. The input/output interface(s) 302 may include any type of output interface known in the art, such as a display (e.g. a liquid crystal display), speakers, a vibrating mechanism, or a tactile feedback mechanism. Input/output interface(s) 302 also include ports for one or more peripheral devices, such as headphones, peripheral speakers, or a peripheral display. Further, the input/output interface(s) 302 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the client workstation 112 may include network interface(s) 304. The network interface(s) 304 may include any sort of transceiver known in the art. For example, the network interface(s) 304 may include a radio transceiver that performs the function of transmitting and receiving radio frequency communications via an antenna. In addition, the network interface(s) 304 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 304 may include wired communication components, such as an Ethernet port or a Universal Serial Bus (USB).

Further, the client workstation 112 may include one or more processor(s) 306 that are operably connected to memory 308. In at least one example, the one or more processor(s) 306 may be a central processing unit(s) (CPU), graphics processing unit(s) (GPU), or both a CPU and GPU or any other sort of processing unit(s). Each of the one or more processor(s) 306 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 306 may also be responsible for executing all computer applications stored in the memory, which can be associated with common types of volatile (RAM) and/or non-volatile (ROM) memory.

In some examples, memory 308 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 308 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 308 may include an operating system 310, a user interface 312, client application(s) 314, an interface component 316, a secure input component 318, a secure data shield component 320, and a secure plug-in component 322. The operating system 310 may be any operating system capable of managing computer hardware and software resources. The operating system 310 may include an interface layer that enables applications to interface with the input/output interface(s) 302 and the network interface(s) 304. The interface layer may comprise public APIs, private APIs, or a combination of both. Additionally, the operating system 310 may include other components that perform various other functions generally associated with an operating system.

The client application(s) 314 may correspond to a web application executed via a web browser. In this example, the web application may be executed on an application server 118 that is communicatively connected to the client workstation 112. In one example, the client application(s) 314 may facilitate an e-commerce transaction which requires any entry of sensitive data, in the form of a PAN, as consideration.

The secure input component 318 may interface with a secure input device 106 to receive devalued data. In this instance, the secure input device 106 is configured to transform sensitive data prior to transmission to the secure input component 318.

The secure data shield component 320 may be configured to prevent data entry on the client workstation that is substantially similar to sensitive data. For example, the secure data shield component 320 may prevent an inadvertent data entry of a data string that is substantially similar to sensitive data. A substantially similar data string may comprise of a data string length that is less than the sensitive data by a predetermined number of characters. The predetermined number of characters may comprise two characters, three characters, four characters, or any number of characters greater than or equal to one character. In this way, the secure data shield component 320 may halt the inadvertent entry of a complete string of sensitive data at a point of partial entry. In a non-limiting example, consider a data entry of a 12-character PAN. In this example, the secure data shield component 320 may prevent the entry of data strings that are substantially similar to a 12-character PAN in any input field within the user interface 312, irrespective of whether the input field is intended to receive the PAN. In other words, if a user accidentally enters a partial PAN in a field intended for the devalued data, or some other text field (i.e. a name field, an address field—or a feedback/suggestions field) on the user interface 312, the secure data shield component 320 may halt any further data entries to that field to ensure that entry of the full PAN cannot be completed.

The secure plug-in component 322 may be configured to invoke a hosted webpage associated with a secure communications server of an SDP network for entry of sensitive data directly at the secure communications server. The secure plug-in component 322 may be installed onto the client workstation 112 at a point in time prior to the consumer initiating the e-commerce transaction. The secure plug-in component 322 may be configured to invoke a hosted webpage associated with the secure communications server for entry of sensitive data directly at the secure communications server. In this way, the inclusion of the secure plug-in acts to isolate sensitive data from the client application(s) 314 that reside and/or operate at the client workstation 112, and similarly to segregate the application server and intermediary web servers from exposure to the sensitive data.

It is noteworthy that the hosted webpage may present its own user interface to capture sensitive data, rather than capturing data entries from a client application. In doing so, the hosted webpage acts to isolate the sensitive data from the intermediary web servers and the application server.

The interface component 316 may interact with an application server to receive an acknowledgment associated with receipt of a token at the application server.

The user interface 312 may provide a consumer with input fields to enter non-sensitive data and sensitive data (e.g. via a hosted webpage invoked by a secure plug-in component 322).

Figure 4:
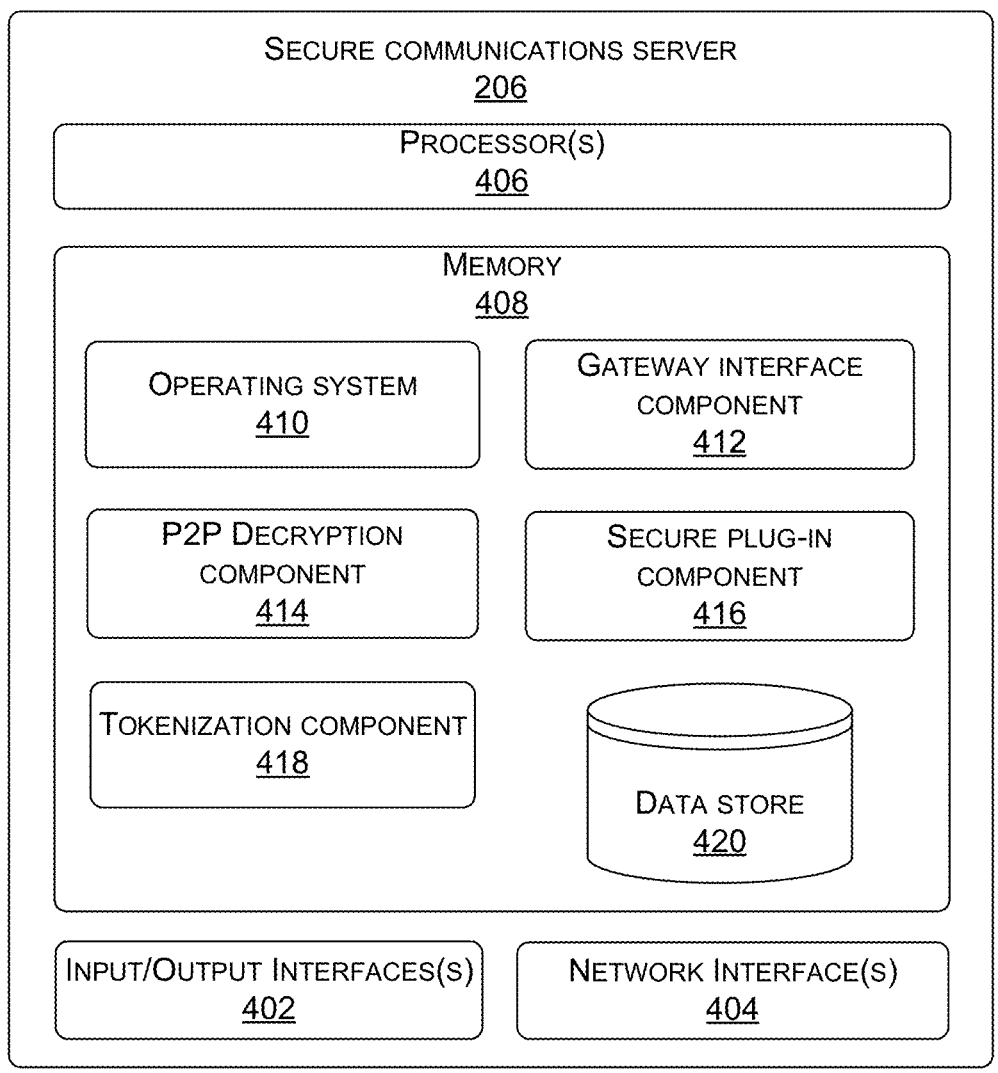
FIG. 4 illustrates a block diagram of various components of a secure communications server that is a part of the SDP network.

FIG. 4 illustrates a block diagram of various components of a secure communications server 206 that is a part of the SDP network. The secure communications server 206 is configured to process, store, and/or transmit sensitive data 102. Therefore, the secure communications server 206 is considered a Category 1 device pursuant to the PCI DSS cybersecurity standard and within scope of an RCA audit.

The secure communications server 206 may include input/output interface(s) 402 and network interface(s) 404. The input/output interface(s) 402 may be similar to the input/output interface(s) 302 and the network interface(s) 404 may be similar to the network interface(s) 304.

The secure communications server 206 may include one or more processor(s) 406 that is operably connected to memory 408. The one or more processor(s) 406 may be similar to the one or more processor(s) 306 and the memory 408 may be similar to the memory 308.

In the illustrated example, the memory 408 may include an operating system 410, a gateway interface component 412, a secure plug-in component 416, a P2PE decryption component 414, a tokenization component 418, and a data store 420. The operating system 410 may be similar to the operating system 310.

The secure plug-in component 416 may be configured to interact with client application(s) on the client workstation. The secure plug-in component 416 may include logic that determines whether operations involve an entry or tracking of sensitive data. In response to detecting the entry or tracking of sensitive data, the secure plug-in component 416 may invoke the hosted webpage that is associated with the secure communications server 206. In a non-limiting example, the secure plug-in component 416 may detect that sensitive data is being entered at a client workstation, and in doing so, invoke the hosted webpage to receive the sensitive data at the secure communications server 206.

In response to a request for entry of sensitive data (i.e. a PAN) from a client application on the client workstation, the secure plug-in component 416 may invoke a hosted webpage associated with a secure communications server for entry of sensitive data directly at the secure communications server. In other words, sensitive data received via the hosted webpage is directly transmitted to the secure communications server. In this way, the inclusion of the secure plug-in acts to isolate sensitive data from the client application(s) that reside and/or operate at the client workstation, and to similarly segregate the application server and intermediary web servers from exposure to the sensitive data. Additionally, the sensitive data captured by the secure plug-in component is protected from being exposed via a non-secure path, such as an ordinary communications path.

It is noteworthy that the hosted webpage may present its own user interface to capture sensitive data at the client workstation, rather than capturing data entries from a client application. In doing so, the hosted webpage acts to isolates the sensitive data from the client workstation.

The gateway interface component 412 may interact with the gateway server 202 of the SDP network 120. In various examples, the interface between the gateway interface component 412 and the gateway server 202 may be at least an ordinary communications path, and optionally secure communications path. In some examples, the gateway interface component 412 may transmit (e.g. a token) and receive (e.g. devalued data) to and from the gateway server 202 via the firewall 204.

The P2PE decryption component 414 is configured to interact with a P2PE server to decrypt/transform devalued data to the sensitive data originally input at the secure input device.

In one example, the P2PE server may be in a different physical location to the secure communications server 206, in which case the devalued data may be transmitted to the P2PE server over an ordinary communications path. The P2PE decryption component 414 may receive the sensitive data (i.e. transformed devalued data) from the P2PE server via a secure communications path. Optionally, the secure communications path may be proprietary to the P2PE server.

The tokenization component 418 is considered to interact with a tokenization server, which generates and returns a token. In some examples, the token may represent a payment authorization for an e-commerce transaction initiated at the client workstation. The tokenization component 418 may transmit sensitive data to the tokenization server via a secure communications path. In return, the tokenization component 418 may receive the token from the tokenization server via an ordinary communications path. The token represent the sensitive data. The token may then be used in place of the sensitive data. The token itself does not include sensitive data and has no extrinsic or exploitable value or meaning. Instead, the token is configured to map back to the sensitive data at the tokenization server.

The data store 420 may be configured to store sensitive data, token, and other sensitive and non-sensitive data associated with transforming devalued data to sensitive data and generating a token based on the sensitive data.

Figure 5:
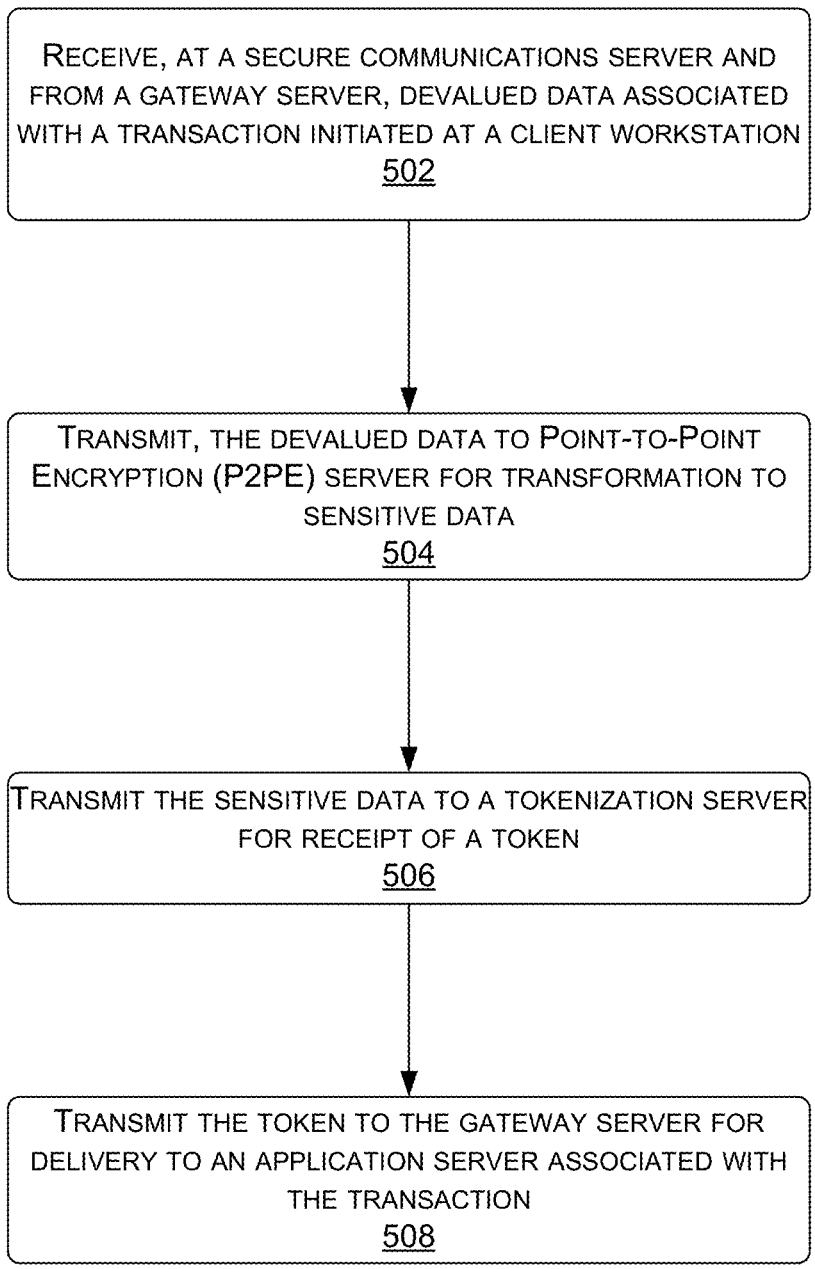
FIG. 5 illustrates a process for generating a token based on an input of sensitive data via a secure input device.

FIG. 5 illustrates a process for generating a token based on an input of sensitive data via a secure input device. In some examples, the input of sensitive data may relate to initiating a sales transaction via a secure input device. Further, the token may represent the sensitive data and may be used instead of the sensitive data (i.e. the PAN) to initiate a sales transaction. Process 500 is presented herein from the perspective of the secure communications server of the SDP network.

At 502, the secure communications server may receive from a gateway server, devalued data associated with a sales transaction initiated at a client workstation. The devalued data may represent payment card information for the sales transaction. The secure communications server may receive the devalued data via an ordinary communications path and via a firewall that separates the secure communications server from the gateway server. In some examples, the devalued data may have been initially provided via a secure input device that is communicatively connected to the client workstation.

At 504, the secure communications server may transmit the devalued data to a P2PE server for transformation to the sensitive data originally input at the secure input device. In one example, the secure communications server may transmit the devalued data to the P2PE server via an ordinary communications path and receive the sensitive data (i.e. transformed devalued data) via a secure communications path or a proprietary secure communications path.

At 506, the secure communications server may transmit the sensitive data to a tokenization server in exchange for a token. The secure communications server may transmit the sensitive data to the tokenization server via a secure communications path. In this example, the token may represents the sensitive data. The token is then used, instead of the sensitive data, to authorize the sales transaction initiated at the client workstation. The token itself does not include sensitive data and is instead configured to map back to the sensitive data at the tokenization server. Therefore, the secure communications server may receive the token from the tokenization server via an ordinary communications path.

At 508, the secure communications server may transmit the token to the gateway server, via the intermediary firewall, for delivery to an application server associated with the e-commerce transaction. The secure communications server may transmit the token to the gateway server via an ordinary communications path. Further, the gateway server may transmit the token to the application server via an ordinary communications path. In some examples, the application server may transmit an acknowledgment of receipt of the token to the client workstation that initiated the sales transaction.

In summary, process 500 describes the secure communications server, the P2PE server, and the tokenization server as interacting directly with sensitive data and therefore considered as Category 1 devices pursuant to the PCI DSS cybersecurity standard, and within scope of an RCA audit. The gateway server is described as having controlled access to the secure communications server and is considered a Category 2 device pursuant to the PCI DSS cybersecurity standard, and therefore within scope of an RCA audit. The client workstation and application server do not interact directly with sensitive data, nor do they have controlled access to a system component (e.g. secure communications server and tokenization server) that interacts directly with sensitive data. Therefore, the client workstation and application server are considered Category 3 devices pursuant to the PCI DSS cybersecurity standard, and out of scope of an RCA audit.

Figure 6:
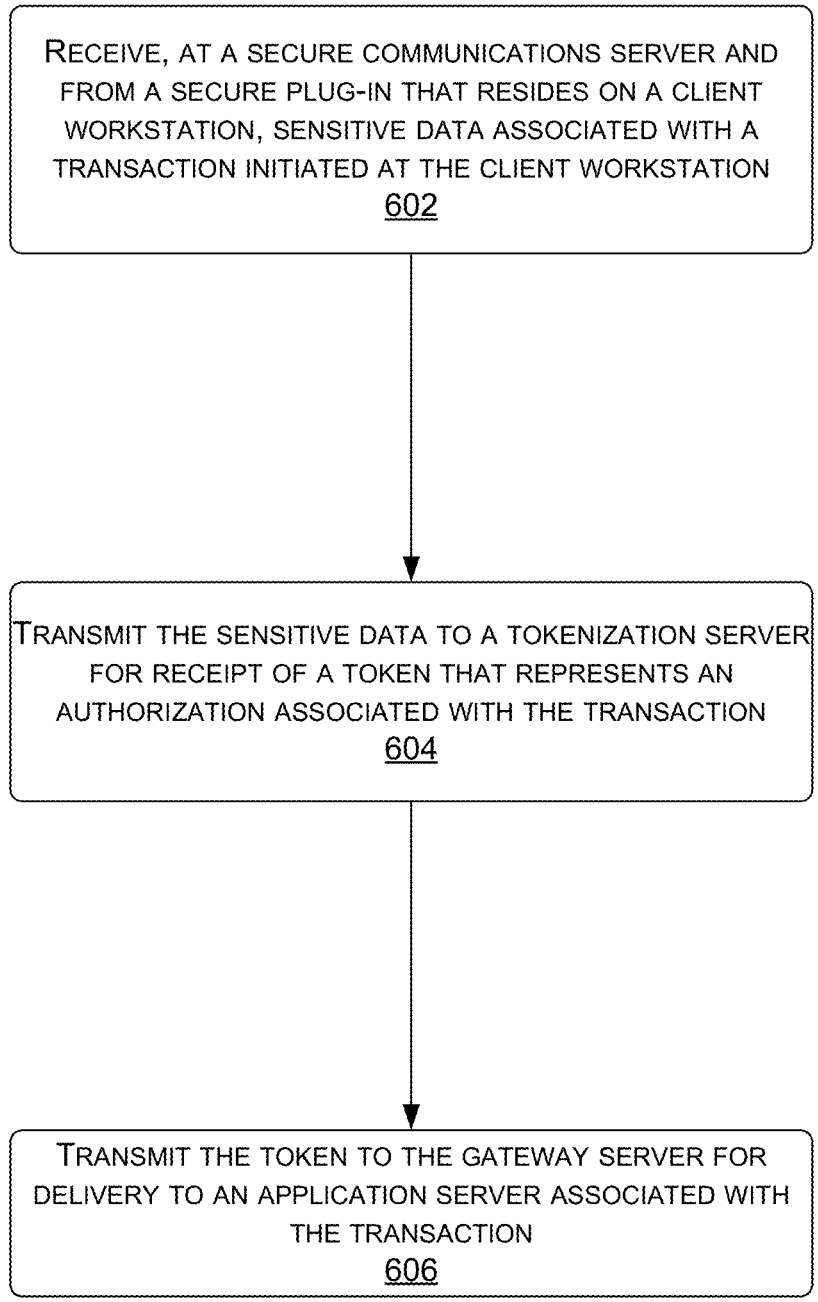
FIG. 6 illustrates a process for generating a token based on an input of sensitive data via a secure plug-in native to a client workstation.

FIG. 6 illustrates a process for generating a token based on an input of sensitive data via a secure plug-in native to a client workstation. The secure plug-in may invoke a hosted webpage associated with a secure communications server of an SDP network. In this example, a consumer may input sensitive data directly into the hosted webpage for receipt at the secure communications server. The sensitive data may relate to an e-commerce transaction initiated by a consumer at the client workstation. Process 600 is presented herein from the perspective of the secure communications server of the SDP network.

At 602, the secure communications server may receive, from a secure plug-in that resides on a client workstation, sensitive data associated with an e-commerce transaction initiated at a client workstation. The secure plug-in may be configured to invoke a hosted webpage associated with the secure communications server for entry of sensitive data directly at the secure communications server.

At 604, the secure communications server may transmit the sensitive data to a tokenization server in exchange for a token. The token itself does not include sensitive data and is instead configured to map back to the sensitive data at the tokenization server. Therefore, the secure communications server may transmit the sensitive data to the tokenization server via a secure communications path and may receive the token via an ordinary communications path.

At 606, the secure communications server may transmit the token to the gateway server, via the intermediary firewall, for delivery to an application server associated with the e-commerce transaction. The gateway server may transmit the token to the application server via an ordinary communications path. In some examples, the application server may transmit an acknowledgment of receipt of the token to the client workstation that initiated the e-commerce transaction.

In summary, process 600, similar to process 500, describes the secure communications server and the tokenization server as interacting directly with sensitive data and therefore considered as Category 1 devices pursuant to the PCI DSS cybersecurity standard, and within scope of an RCA audit. The gateway server is described as having controlled access to the secure communications server and is considered a Category 2 device pursuant to the PCI DSS cybersecurity standard, and therefore within scope of an RCA audit. The client workstation, intermediary web servers, and the application server do not interact directly with sensitive data, nor do they have controlled access to a system component (i.e. secure communications server and tokenization server) that interacts directly with sensitive data. Therefore, the client workstation and application server are considered Category 3 devices pursuant to the PCI DSS cybersecurity standard, and out of scope of an RCA audit.

Much of the above discourse regarding the SDP network has been in the context of payment systems and compliance with payment card standards such as PCI DSS. However, the core of the SDP network is to transfer risk. Specifically, sensitive data of any sort, not just payment information, can be placed on a separate secure channel belonging to another party, such that a user's enterprise infrastructure never touch, let alone process, the sensitive data. In this way, an end to end communications channel is segmented and securely shielded, not only by portions that touch sensitive data but also by each segment that is owned by different parties. Parties willing to assume the risk for sensitive data may then become responsible for those portions and may take fees from other parties not willing or able to bear that risk. The following are some example use cases.

Social network applications collect a large amount of user information. Not only do social application sites collect facts and media about a user, but also collect user behavior. Some companies are using summaries of user behavior for identification purposes. Other companies are using summaries of user behavior to evaluate individuals for creditworthiness or for employment. Accordingly, in some circumstances, a user may wish to anonymize or otherwise control access to at least some of this data.

Social networks are an example of public business to consumer (B2C) exposure. However, there are B2C scenarios that are less public, but no less sensitive. This arises in regulatory situations, such as a Department of Motor Vehicles, or in medical cases. For medical data, the Health Insurance Portability and Accounting Act (HIPAA) regulates the handling of patient data.

As with the social media scenario above, a secure plug-in component may contain logic to determine which user operations involve sensitive data. When the medical data is associated with a token and not with any personally identifiable data for the individual, then the medical data is devalued. When the medical data needs to be merged with the personally identifiable data, then this can be done in a segregated and limited system that is simpler to assure as compliant with HIPAA and be managed by a compliant third-party. Again, the secure plug-in component may activate a secure plug-in associated with the secure communications server to isolate the entered sensitive data. In this way, a separate third party, willing and able to comply with HIPAA regulations on data may guarantee such compliance while relieving the electronic medical records system from HIPAA requirements.

In both the social network and HIPAA scenarios outlined above, handling of private data may be performed either by a cybersecurity business entity or a third-party. By isolating the personally identifiable information and any other regulated or sensitive data away from all other content and ensuring that non-secure infrastructure has neither access or contact with that regulated or sensitive data, the user's data is protected.

Also note that in the payment examples, those services may be new services for delegating the handling of private data. Note that those services need not be centralized services but may be decentralized using distributed ledgers such as blockchain.

Conclusion

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
under control of one or more processors:
detecting a partial data entry of sensitive data in an input field of a client workstation, the sensitive data being associated with a transaction initiated at the client workstation, the partial data entry of sensitive data having a first number of characters that is less than a threshold number of characters of a completed string of the sensitive data;
determining whether the partial data entry occurs within a first input field that is configured to receive sensitive data or a second input field that is configured to receive non-sensitive data;
in response to determining that the partial data entry occurs within the second input field, preventing completion of the partial data entry within the second input field;
in response to determining that the data entry occurs within the first input field, permitting completion of the partial data entry within the first input field;
transmitting devalued data that was generated at the client workstation, the devalued data representing the sensitive data that was entered in the first input field;
extracting the sensitive data from the devalued data;
transmitting, to a tokenization server, a request for a token that represents the sensitive data extracted from the devalued data, the request including the sensitive data;
receiving the token from the tokenization server; and
transmitting the token to a gateway server.

2. The computer-implemented method of claim 1, wherein the token is further transmitted from the gateway server to an application server to initiate the transaction.

3. The computer-implemented method of claim 1, wherein the devalued data was received at the client workstation via a secure input device, and
wherein receiving the set of data occurs via an application server to the gateway server.

4. The computer-implemented method of claim 1, wherein the transaction corresponds to a sales transaction, and the sensitive data corresponds to a Personal Account Number (PAN) associated with a user that initiated the transaction.

5. The computer-implemented method of claim 1, wherein the transaction corresponds to a handling of medical data in accordance with a Health Insurance Portability and Accounting Act (HIPAA), and the sensitive data corresponds to the medical data.

6. A secure communications server inside a secure data processing (SDP) network, the secure communications server comprising:
one or more processors;
memory coupled to the one or more processors, the memory including one or more modules that are executable by the one or more processors to:
receive devalued data associated with a transaction conducted at least in part at a client workstation that is outside of the SDP network, the devalued data representing sensitive data permitted for entry in a first input field on the client workstation that is configured to receive sensitive data and prevented from entry in a second input field on the client workstation that is configured to receive non-sensitive data;
send the devalued data to a point-to-point encryption (P2PE) server;
receive, from the P2PE server, the sensitive data that was represented in the devalued data;
transmit, to a tokenization server, a request for a non-sensitive token that represents the sensitive data, the request including the sensitive data received from the P2PE server;
receive, from the tokenization server, the non-sensitive token that represents the sensitive data; and
transmit the non-sensitive token to a gateway server that is inside the SDP network, the gateway server being configured to deliver the non-sensitive token to an application server that is outside of the SDP network and associated with the client workstation.

7. The secure communications server of claim 6, wherein to transmit the non-sensitive token to the gateway server occurs via a firewall that is inside of the SDP network and configured to prevent transmission of sensitive data to the gateway server.

8. The secure communications server of claim 6 wherein the transaction corresponds to a sales transaction, and
wherein the sensitive data corresponds to a PAN associated with a user that initiated the transaction.

9. A client workstation, comprising:
one or more processors;
memory coupled to the one or more processors, the memory including one or more modules that are executable by the one or more processors to:
detect, in any input field, a partial data entry of sensitive data that is associated with a transaction initiated at the client workstation, the partial data entry of sensitive data having a first number of characters that is less than a threshold number of characters of a completed string of the sensitive data;
determine whether the partial data entry occurs within a first input field that is configured to receive the sensitive data or a second input field that is configured to receive non-sensitive data;
in response to determining that the partial data entry occurs within the second input field, prevent completion of the partial data entry within the second input field;
in response to determining that the data entry occurs within the first input field, permit completion of the partial data entry to create a set of data;
determine whether the set of data corresponds to devalued data of the sensitive data or the sensitive data;
in response to the set of data corresponding to the devalued data, transmit the set of data to a gateway server of a Secure Data Processing (SDP) network; and
receive, via an application server, an acknowledgement that the application server received a token that represents the sensitive data.

10. The client workstation of claim 9, wherein the client workstation is communicatively connected to a secure input device, and
wherein the set of data is received from the secure input device, the secure input device being configured to transform the sensitive data into the devalued data prior to delivery to the client workstation.

11. The client workstation of claim 9, wherein to transmit the set of data to the gateway server occurs via the application server.

12. The client workstation of claim 9, wherein the threshold number of characters associated with the sensitive data corresponds to a number of characters of the completed string of the sensitive data.

13. The client workstation of claim 9, wherein the transaction corresponds to a sales transaction, and the sensitive data corresponds to a Personal Account Number (PAN) associated with a user that initiated the transaction.

14. The client workstation of claim 9, wherein the one or more modules are further executable by the one or more processors to:
   determine a sensitive data character string length associated with the sensitive data, and
   wherein to prevent continued entry of the initiated data entry in the second input field is based at least in part on preventing the initiated data entry from exceeding an input character length that is equal to the sensitive data character string length minus a predetermined number of characters.

\* \* \* \* \*